US012791985B2

(12) United States Patent
Linstrument et al.

(10) Patent No.: US 12,791,985 B2
(45) Date of Patent: Nov. 10, 2026

(54) METHOD FOR MANUFACTURING A HOROLOGY COMPONENT

(71) Applicant: ROLEX SA, Geneva (CH)

(72) Inventors: Christophe Linstrument, Bonneville (FR); Nicolas Moretti, Chilly (FR); Christophe Paillot, Sciez (FR); David Riboli, Arthaz (FR); Yoan Tinant, Neuvecelle (FR)

(73) Assignee: ROLEX SA, Geneva (CH)

( * ) Notice: Subject to any disclaimer, the term of this patent is extended or adjusted under 35 U.S.C. 154(b) by 715 days.

(21) Appl. No.: 17/712,798

(22) Filed: Apr. 4, 2022

(65) Prior Publication Data

US 2022/0317630 A1 Oct. 6, 2022

(30) Foreign Application Priority Data

Apr. 6, 2021 (EP) .................................... 21167068
Mar. 28, 2022 (EP) .................................... 22164739

(51) Int. Cl.
*G04D 3/00* (2006.01)
*G04B 19/10* (2006.01)
*G04B 19/12* (2006.01)

(52) U.S. Cl.
CPC ........... *G04D 3/0092* (2013.01); *G04B 19/10* (2013.01); *G04B 19/12* (2013.01)

(58) Field of Classification Search
CPC ..... G04B 37/0008; G04B 19/12; G04B 19/10
See application file for complete search history.

(56) References Cited

U.S. PATENT DOCUMENTS 10,649,406 B2 5/2020 Noirot et al.
11,745,536 B2 9/2023 Bienvenu et al.
11,960,205 B2 4/2024 Calame et al.
2014/0363608 A1 12/2014 Russell-Clarke et al.
2015/0049593 A1 2/2015 Oliveira
2016/0263698 A1 9/2016 Noirot et al.
2019/0187620 A1 6/2019 Raillard et al.
2019/0391534 A1 12/2019 Di Luna et al.
2020/0086678 A1 3/2020 Bienvenu et al.
2020/0201172 A1 6/2020 Calame et al.
(Continued)

FOREIGN PATENT DOCUMENTS

CH 708023 B1 6/2018
CN 10007585 A 7/2019
CN 111352335 A 6/2020
(Continued)

OTHER PUBLICATIONS

Machine Translation of EP_3067220_B1 (Year: 2018).*
(Continued)

*Primary Examiner* — Jacob J Cigna
(74) *Attorney, Agent, or Firm* — Seckel IP, PLLC

(57) ABSTRACT

A method for manufacturing a horology component comprising a surface that is to be treated, this surface being prepared beforehand through a substep of polishing and/or through a substep of adding a malleable upper layer (2), wherein said method comprises: a first surface structuring (E10) of said surface that is to be treated of the horology component, followed by a second surface structuring (E20) of said surface that is to be treated, structured by the previous first surface structuring step (E10).

27 Claims, 5 Drawing Sheets

(56) References Cited

U.S. PATENT DOCUMENTS

Figure 1:
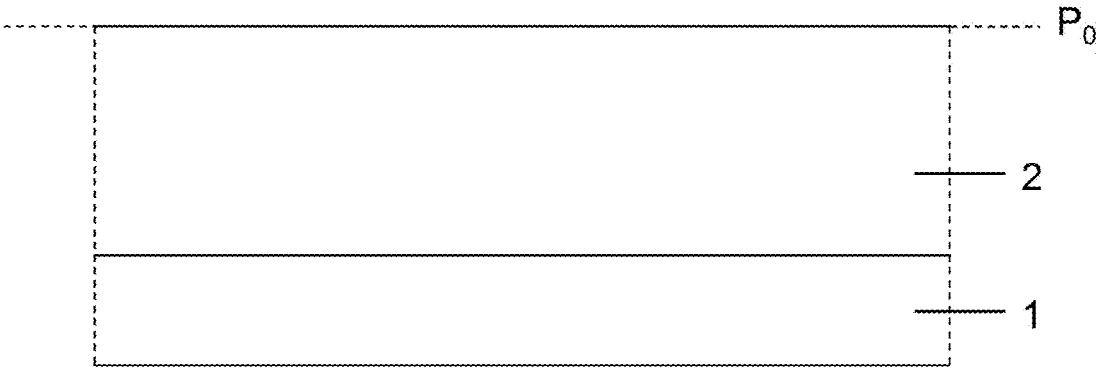

| | | | |
|---|---|---|---|
| 2020/0293001 | A1 | 9/2020 | Jeanrenaud et al. |

FOREIGN PATENT DOCUMENTS

| | | | |
|---|---|---|---|
| CN | 111694262 | A | 9/2020 |
| EP | 3067220 | A1 | 9/2016 |
| EP | 3067220 | B1 | 4/2018 |
| EP | 3588202 | A1 | 1/2020 |
| JP | 2015-514582 | A | 5/2015 |
| JP | 2016-183961 | A | 10/2016 |
| JP | 2020-30201 | A | 2/2020 |
| JP | 2020-076740 | A | 5/2020 |

OTHER PUBLICATIONS

European Search Report and Written Opinion dated Aug. 24, 2021 in priority application No. EP21167068; with English machine translation (total 16 pages).

CN Office Action and Search Report dated Mar. 11, 2026 in corresponding application No. CN 2022103591703; with English machine translation (total 23 pages).

JP Office Action and Search Report dated Mar. 17, 2026 in corresponding application No. JP 2022-062242; with English machine translation (total 12 pages).

* cited by examiner

METHOD FOR MANUFACTURING A HOROLOGY COMPONENT

This application claims priority of European patent applications Nos. EP21167068.2 filed Apr. 6, 2021 and EP22164739.9 filed Mar. 28, 2022, the content of each of which is hereby incorporated by reference herein in its entirety.

The invention relates to a method for manufacturing a horology component, notably a watch horology component. It also relates to a horology component as such, obtained by implementing such a method. The invention finally also relates to a timepiece, notably a watch, for example a wristwatch, comprising such a horology component.

When a particular surface finish is to be applied to a horology component, for example in order to form identification zones and/or indexing and/or decoration on a dial, it is known practice to work the surface in order to give it a structure, known as a surface structuring, traditionally using methods such as grinding, brushing or diamond polishing for example. This step may be combined with various steps of applying color, such as varnishing, galvanoplasty or PVD, in order to form zones of respective different colors on the surface of the horology component. To complement this, steps of adding inserts and/or of affixing attached decorative elements are sometimes performed.

Note that the solutions for finishing a surface of a horology component are very delicate because horology applications are very demanding: the desired appearance, both from a functional and an esthetic standpoint, is very important, needs to be very precise, repeatable and naturally free of defects or burrs. The requirements in terms of robustness are also high, because the components thus formed are liable to be exterior decorative components subject to shocks and to an environment which may sometimes be harsh (seawater, sweat, etc.).

It is an object of the invention to provide a method for manufacturing a horology component, notably a dial, which allows a novel, precise and attractive appearance to be achieved in a simple way with a great deal of versatility while being durable over time.

To this end, the invention relates to a method for manufacturing a horology component comprising a surface that is to be treated, this surface being optionally prepared beforehand through a substep of polishing and/or through a substep of adding a malleable upper layer, wherein said method comprises the following steps:

- a first surface structuring of said surface that is to be treated of the horology component, followed by
- a second surface structuring of said surface that is to be treated, structured by the previous first surface structuring step.

A method of manufacture, a horology component and a timepiece according to the invention are particularly defined by the claims.

These objects, features and advantages of the present invention will be set out in detail in the following description of one particular embodiment given by way of nonlimiting example in connection with the attached figures among which:

FIG. 1 schematically depicts, in cross section, a prior step of preparing a dial plate according to one embodiment of the invention.

Figure 2:
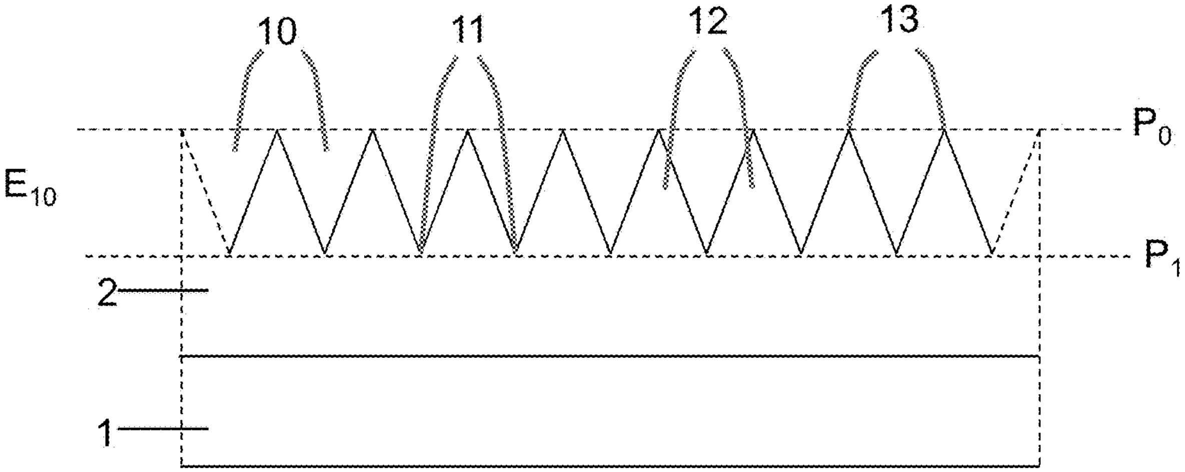

FIG. 2 schematically depicts a view in cross section of the dial plate after a first step of the method according to the embodiment of the invention has been performed.

Figure 3:
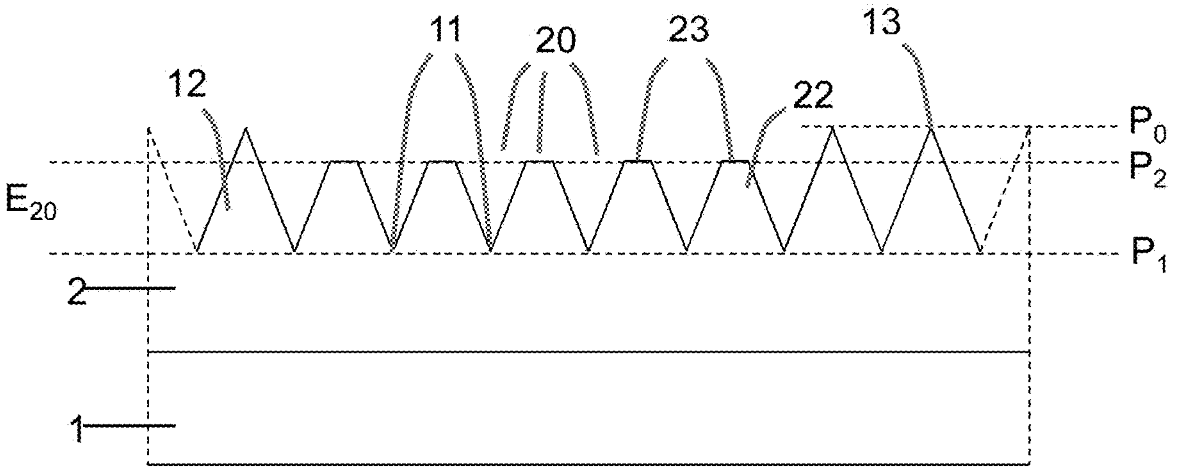

FIG. 3 schematically depicts a view in cross section of the dial plate after a first variant of a second step of the method according to the embodiment of the invention has been performed.

Figure 4:
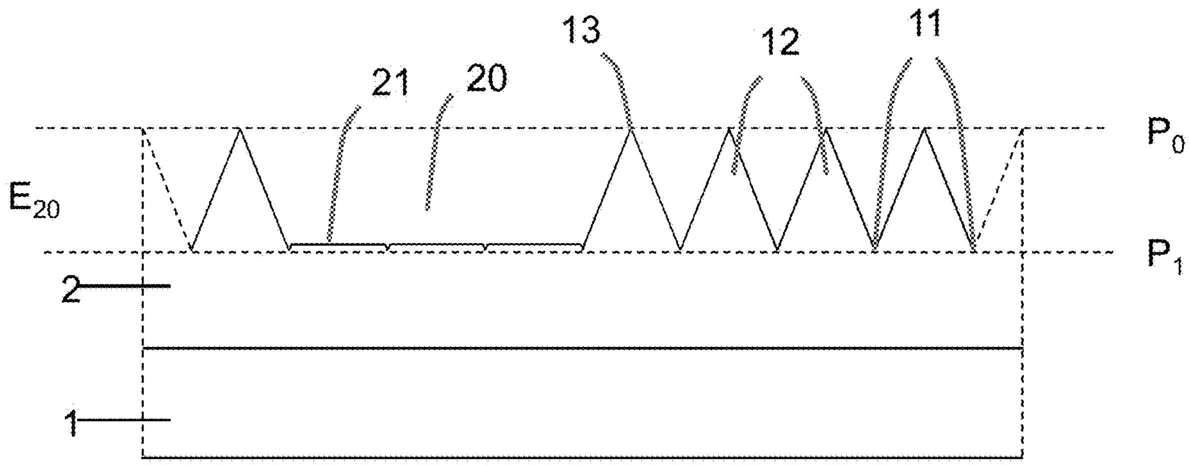

FIG. 4 schematically depicts a view in cross section of the dial plate after a second variant of a second step of the method according to the embodiment of the invention has been performed.

Figure 5:
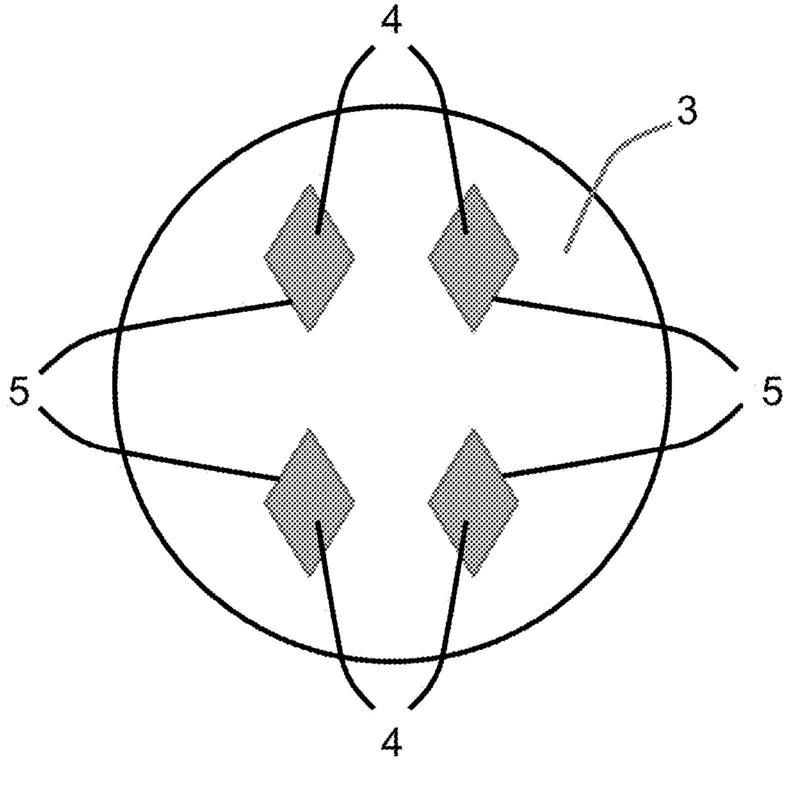

FIG. 5 schematically depicts a view from above of a dial plate according to the embodiment of the invention.

Figure 6:
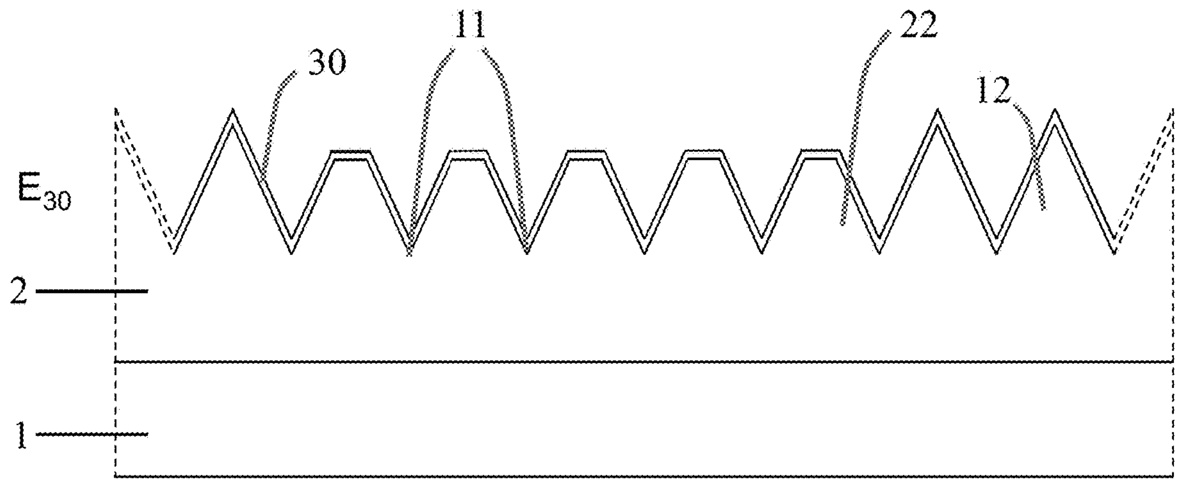

FIG. 6 schematically depicts a view in cross section of the dial plate after a coloration step of the first variant of the method according to the embodiment of the invention has been performed.

Figure 7:
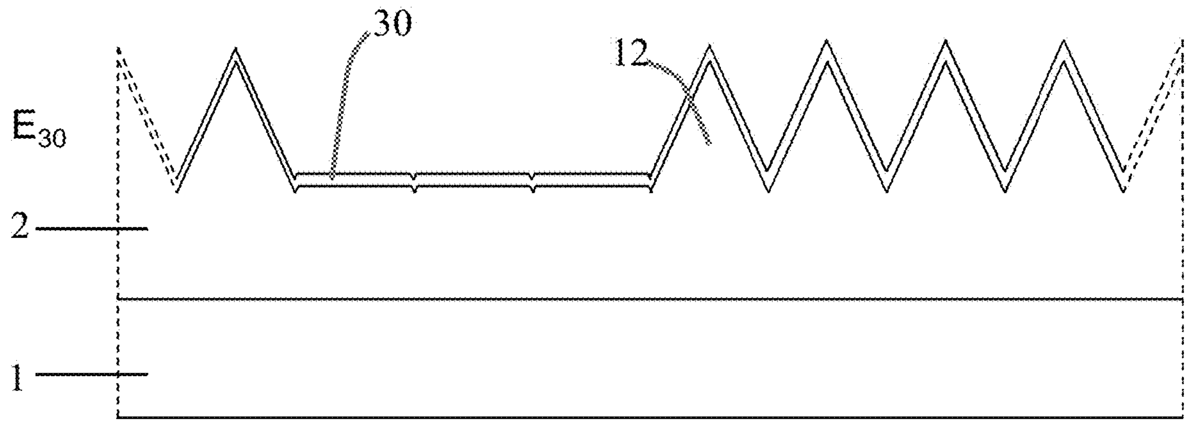

FIG. 7 schematically depicts a view in cross section of the dial plate after a coloration step of the second variant of the method according to the embodiment of the invention has been performed.

Figure 8:
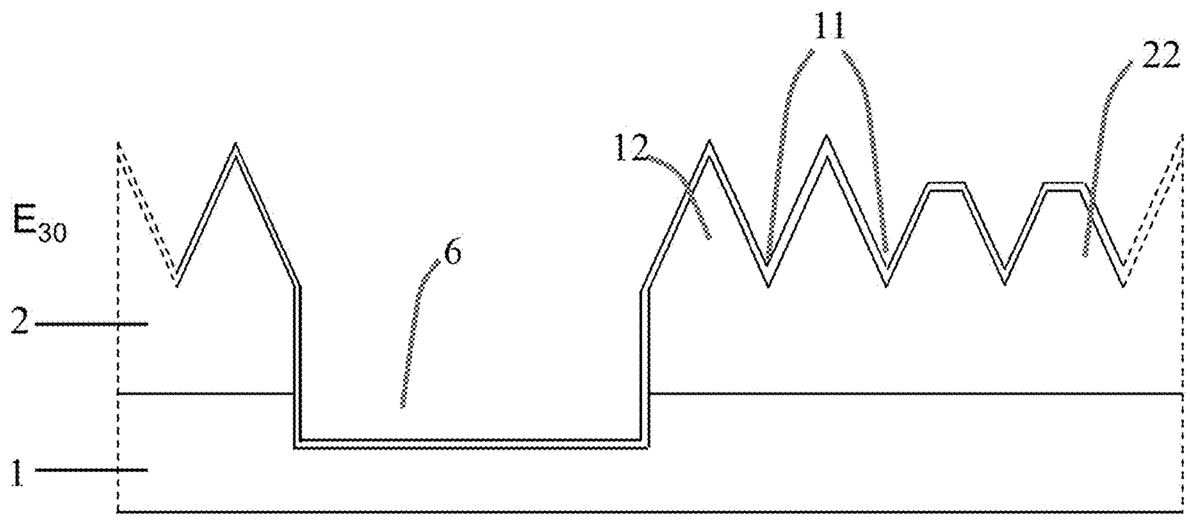

FIG. 8 schematically depicts a view in cross section of the dial plate after another variant of the method according to the embodiment of the invention has been performed.

Depending on the embodiment of the method for manufacturing a horology component of the invention, use is made of a particular combination of at least two surface structuring steps, by applying at least two steps of surface structuring in superposition on the one same zone of a surface that is to be treated of a horology component.

The requirements and the complexity of the surface structuring operations mean that it had previously been considered to be unrealistic to combine two surface structuring operations on the one same surface, as it was assumed that the second surface structuring step would degrade the result obtained by the first surface structuring step and cause it to lose all its benefit. For example, certain combinations of surface structuring could not be obtained using the traditional methods of the prior art, such as striations in different directions or sand blasting with finer impacts than with traditional media, as well as certain configurations delimiting recessed decoration (of a depth greater than the thickness of a malleable layer for example, without altering the surface texturing). This preconception is overcome here by the invention, as will be detailed hereinafter. The invention demonstrates that this combination even affords a benefit that extends beyond the simple combination of surface treatment steps.

We shall use the expression "surface structuring" or, as an alternative, "surface texturing" to refer to a step that modifies the topography of the surface of a component by modifying the roughness thereof. We shall use the term "texturing" to refer to the surface condition obtained by one or more surface structuring steps. Note that such a surface structuring step differs from steps of adding and removing material, which create more significant reliefs in the thickness of a component. A surface structuring step therefore acts only on the surface, over a very shallow depth, with very little or no removal of material.

We shall use the adjective "upper" to refer to a surface or a volume oriented toward a surface intended to be treated by the process of the invention. Said process applies therefore on a surface that is to be treated, which extends wholly or in part on the upper surface of a horology component. Advantageously, it would be a visible surface of a horology component. As an example, in the case of a dial, the upper surface, which is treated by the invention, is the surface visible by a user of a watch comprising this dial.

In other words, the surface structuring creates a shallow topography by scratching the surface of the horology component in a controlled, potentially random, way; alternatively, by sand blasting or wet sand blasting the upper surface using abrasive media. The tools used may for example be abrasive-covered pads or brushes, or may be sand blasting or wet sand blasting systems, or lasers such as femtosecond lasers or nanosecond lasers.

According to one embodiment, a surface structuring creates reliefs that are recessed with respect to an initial surface of a component, of a mean depth less than or equal to 0.1 μm, or even as a variant less than or equal to 0.3 μm, or even less than or equal to 0.8 μm, or even less than or equal to 1 μm, or even less than or equal to 1.5 μm, or even less than or equal to 3 μm, or even less than or equal to 4 μm. The depth of a relief in a given zone on a surface is the distance between the lowest point of the relief and the initial surface. The mean depth is, by definition, the mean of the depths over a treated surface. Furthermore, such a surface structuring preferably creates reliefs of a mean depth greater than or equal to 0.05 μm.

According to one embodiment, one surface structuring step forms a surface roughness preferably of between 0.05 μm and 4 μm, or even 0.05 μm and 3 μm, or even between 0.1 μm and 1.5 μm, or even between 0.05 μm and 0.1 μm. Note that the roughness can be measured from the surface finish parameters by applying standard ISO 25178, such as:

Sq: the height parameter corresponding to the root mean square deviation (the root mean square of the heights inside the base area); or Sz: the height parameter corresponding to the maximum amplitude of the surface (the sum of the maximum peak height and maximum valley depth, inside a base area).

According to one embodiment, one surface structuring may form striations, or scratches, or even other recessed shapes in the surface that is to be treated, to an aforementioned shallow depth and/or in such a way as to form a small surface roughness. According to one embodiment, these striations are preferably sufficiently dense, uniform and/or organized, and/or form a particular fill pattern to give an attractive visual appearance. By way of advantageous example, the striation density is such that two adjacent striations are separated by a mean distance less than or equal to 10 μm for example, or even less than or equal to 3 μm for example.

The invention will now be illustrated nonlimitingly in the context of the finishing of the surface of a watch dial. It could naturally be employed to treat any surface of another horology component, of a wristwatch or of a timepiece movement, such as, for example and nonlimitingly, a bezel, blanks and movement supplies, notably covers, barrel drums or ratchet wheels.

The invention relates more specifically to a phase in the surface treatment of a horology component and preferably occurs toward the end of manufacture of a horology component. It therefore contributes to the manufacture of a horology component.

The method according to the embodiment of the invention comprises an optional prior step of preparing the surface of the horology component.

For that, the upper surface, which is to say the surface that is intended to be treated and preferably intended to be visible, of a brass dial plate is prepared through a first substep of preparation, for example polishing, which is optional, before a second substep of depositing a malleable layer, this substep likewise being optional. Alternatively, a brass dial plate is prepared by a first substep of adding a malleable upper layer, optional, before a second substep of preparation, for example of polishing, also optional. We shall use the expression "malleable layer" to refer to a layer made from a metal material that is soft enough, particularly when cold, to facilitate surface structuring steps such as those that will be described later on, and that is ductile, so that it maintains the deformation applied. Such a malleable layer therefore advantageously contains a malleable metal material, such materials including silver or gold or silver or gold alloys respectively containing at least 50 wt % of silver or of gold. As an alternative, the dial plate, or any other horology component that is to be decorated, may be made from another metallic material, the term metallic including a pure metal or any metal alloy such as steel, titanium, gold, or may be nonmalleable (which is to say containing less than 50 wt % of gold) or made of platinum. Alternatively, a plate made of ceramic, for example of zirconia or of alumina, of silicon, of glass, of sapphire, of pearl or of a mineral material, the background of which exhibits the natural color of the material or is colored in a given color, for example in white, could also be imagined.

In other words, according to a first embodiment, the horology component comprises an upper surface made of a rigid material, which is to say belonging to a surface layer made of rigid (nonmalleable) material, in which the double surface structuring of the invention is performed directly. According to a second embodiment, the horology component comprises an upper surface made of a rigid material, and the method according to the invention employs a prior step of depositing a malleable layer on said layer of rigid material, so that the invention (the at least two superposed structurings) will be performed on said layer of malleable material covering the layer of rigid material. Said layer of malleable material forms the new upper layer of the horology component. According to a third embodiment, the horology component directly comprises a surface made of malleable material, which is to say at least one surface layer of malleable material, in which the double surface structuring of the invention is performed directly, naturally without the need to implement the optional prior step of adding a malleable layer. It may thus, for example, take a massive form, monobloc, made as a single layer of said malleable material. As a variant, it may present several superposed layers of malleable material, for example a layer based on silver covering a layer based on gold. As an example, a layer of the horology component may be a simple coating or a thicker massive layer.

By way of detailed exemplary embodiment, a flat polished brass dial plate may undergo the following various substeps of depositing:

a) a first layer of nickel, for example 2 microns thick, using electroplating, uniformly, followed by b) a gold-plating layer, for example 0.2 microns thick, using electroplating, uniformly, followed by c) a layer of silver, for example 4 microns thick, using electroplating, uniformly.

In this example, what is thus obtained is a malleable layer, comprising several layers, and thus a multilayer layer, with a total thickness of 6.2 microns, comprising a particularly malleable upper layer made of silver. More generally, it will be advantageous to deposit a multilayer or single layer of malleable material, of a thickness less than or equal to 10 μm or even less than or equal to 7 μm.

FIG. 1 schematically illustrates a vertical section through such a dial plate, made up of a lower part 1 made of brass, covered with a malleable upper layer 2 made of silver. Any sublayers there might be have not been depicted in order to simplify the depiction. Furthermore, the thickness of the malleable layer 2 has deliberately been exaggerated to facilitate illustration of the invention, and is therefore not to the true scale. The upper surface of the malleable layer 2 is flat, in a plane that will form a reference plane $P_0$ for the remainder of the description. The dial could comprise any other number of layers of different materials, one single layer, or two, three, four, five or more.

The method of manufacture then implements a first step E10 of first surface structuring of the surface that is to be treated of the dial. According to one advantageous embodiment, this first structuring forms first striations 10. The result of this first surface structuring is illustrated in FIG. 2 which depicts a view in vertical section in a plane substantially perpendicular to the dial plate and perpendicular to the striations 10. It illustrates a cross section of the striations 10 of this imaginary decoration. These striations 10 are formed in the upper surface of the dial, more specifically in the malleable layer 2. Specifically, in this embodiment, the layer of silver is textured, with a decoration made up of striations.

According to the embodiment illustrated, the striations 10 have a triangular cross section. In addition, the striations 10 are advantageously very closely spaced. Thus, the cross section between two striations 10 forms ribs 12 likewise of triangular cross section, of which the tops 13 lie substantially in the reference plane $P_0$. According to one advantageous embodiment, the striations 10 are wholly formed in the malleable layer 2 made of silver, which is to say that their deepest part, forming the bottoms 11 of the striations 10, is situated in the malleable layer 2. According to the embodiment, the bottoms 11 of all the striations 10 lie in the one same second plane $P_1$ located in the malleable layer 2 and substantially parallel to the reference plane $P_0$. In other words, the bottoms of the striations 10 do not reach the bottom of the malleable layer 2, do not reach the brass lower part 1 of the dial plate. According to the embodiment, the depth of this texturing is of the order of 0.5 μm. Note that this first surface structuring step E10 may be applied to all or part of the upper surface of the dial plate.

Naturally, the intermediate striations and/or ribs may have other shapes, notably other cross sections, than those depicted. They may advantageously be more closely spaced, have a mean spacing less than or equal to 10 μm, or even less than or equal to 5 μm, or even less than or equal to 1 μm, and/or comprised between 0.5 μm and 30 μm, or even between 1 and 20 μm, or even between 1 and 10 μm.

Optionally, a step of depositing a gold-plating layer 0.2 μm thick is then performed, uniformly, by electroplating, so as to protect the surface made of silver: this protects the textured silver against alteration, oxidation and sulfurizing. This deposition follows the surface, which is to say maintains the topography of the texturing of the surface treated by the first surface structuring step, on which the gold is deposited. Alternatively, a fine surface deposition, which follows the surface (it is a surface conformity approach), using an atomic layer deposition (ALD) technique may be performed. This step is optional and not illustrated. This optional step of depositing a gold-plating layer, or, alternatively, of depositing some other protective layer, may take place before and/or after each structuring step (E10, E20 and the optional additional structuring steps).

The method of manufacture according to the embodiment of the invention therefore implements a second step E20 of applying a second surface structuring to the surface that is to be treated of the dial. This second surface structuring is performed at least over part of the surface already treated by the first surface structuring so that the effects of the two surface structurings are superposed and combined, as will be detailed. Through this superposition, the second surface structuring modifies part of the roughness formed by the first surface structuring.

It may for example modify the tops of the roughnesses of the first surface structuring without modifying the bottoms of the first surface structuring, as will be illustrated hereinbelow.

The result of this second surface structuring according to the embodiment is illustrated in FIG. 3. The second surface structuring forms second striations 20 the orientation of which differs from the orientations of the first striations 10 formed by the first surface structuring. They therefore intersect the striations of the first surface structuring. In particular, the second structuring has the effect of removing the tops of some of the ribs 12 present between the first striations 10 formed by the first surface structuring. The result of this is that some of these ribs 12, referred to as clipped peaks 22, have a modified cross section.

FIG. 3 illustrates the cross section of the dial plate on a vertical plane comprising a second striation 20 produced by a first variant of the second surface structuring. This striation is able to clip the tops of several juxtaposed ribs 12 formed by the first surface structuring. Indeed, it may be seen that the tops of the clipped peaks 22 are truncated, in a way equivalent to one another. As a result, the ribs 12 of the first surface structuring have been converted into clipped peaks 22 of trapezoidal cross section, of which the upper surface 23 forms a flat surface substantially parallel to the dial plate in an intermediate plane $P_2$ lower than the reference plane $P_0$ containing the tops 13 of the initial ribs 12. According to the embodiment, the intermediate plane $P_2$ is positioned between the reference plane $P_0$ and the first plane $P_1$, parallel thereto.

According to the embodiment, some of the striations 10 and of the ribs 12 produced by the first structuring remain unchanged. Note that the second surface structuring may be applied to all or part of the surface treated by the first surface structuring.

Furthermore, according to this advantageous embodiment, the second surface structuring performs a surface treatment to a depth less than that of the first structuring so that it acts only partially on the first structuring, notably leaving the bottoms 11 of all the striations 10 intact. The depth of the first surface structuring corresponds to the distance between the planes $P_0$ and $P_1$, whereas the depth of the second surface structuring corresponds to the distance between the planes $P_0$ and $P_2$.

According to one embodiment, the second surface structuring step is performed by wet sand blasting through a mask, which has the effect of slightly abrading the peaks of the decoration, which is to say the tops 13 of the ribs 12, as described hereinabove. The wet sand blasting is performed in the traditional way alternatively, it could be performed using sand blasting. According to the embodiment, the depth of the wet sand blasting step is of the order of 0.2 μm. Visually, the appearance of the decoration disappears locally in favor of a structure of rough uniform appearance. According to the embodiment, the second surface structuring step therefore acts on just part of the surface treated by the first surface structuring, this part being defined by the mask used to protect those zones of the surface that is to be treated that are not to be modified by the second surface structuring, which is to say so as to keep the decoration achieved by the first surface structuring intact. By way of example, this mask may be made of a photosensitive resin. The second surface structuring therefore acts only on the unmasked zones, so as to locally lessen the first texturing in a controlled manner.

Alternatively, the second surface structuring step may be performed using a laser. Using this technique, not only is there no need for masking, but the resolution of the texturing is extremely precise. The use of a laser makes it possible, in addition to clipping the peaks of the reliefs of the texturing, potentially at a number of levels, to create for example recessed decoration outlines during the same step. Finally, the use of a laser allows the texturing effect to be shaded. Use is preferably made of a femtosecond laser, altering various parameters to achieve the desired optical effect. The parameters concerned are notably the power, the diameter of the beam, the fluence, the surface scan rate, the degree of longitudinal and lateral overlap of the pulses as they move, the pulse repetition rate, the mean energy per pulse, the pulse duration, the beam wavelength, and the defocusing. Additional variations may be induced according to the scan and trajectory strategies: the scan may be in one direction (known as "hatching" or "simple hatching"), or a scan may be performed in a first direction and then in another, for example perpendicular, direction ("0°-90° crosshatching") or at 120° ("0°-120° crosshatching"), generating beams with superposed trajectories and different orientations. For example, the complete/partial peak clipping is metered by influencing the various laser parameters to meter the amount of energy supplied per unit time and unit area, therefore metering the impact of the laser, and by influencing the scan strategies.

It may also be noted that the femtosecond laser may allow texturing to be achieved while at the same time partially "depressing" in a translational movement the topography to which it is applied in a partially "surface conformity" (which is to say reproducing) fashion. Thus, in an embodiment other than that depicted, the second surface texturing may be performed using a femtosecond laser so as to partially depress the first texturing formed by the first surface structuring, in a way that respects partially the surface conformity.

The second surface structuring may therefore be applied to predefined zones delimited by any outlines, for example regular shapes such as polygons. These zones lie in a previously textured location. FIG. 5 illustrates by way of example a view from above of a dial resulting from such an embodiment, the surface of which comprises a sunray zone 3, resulting from the first surface structuring alone, and zones 4 comprising the double surface structuring.

Optionally, the outline of these zones 4 is highlighted by a groove 5 also produced using a laser. In this example, in order to create a depth effect, the groove 5 is deep enough to pass through the entirety of the malleable layer 2 and reach the brass of the lower part 1 of the dial plate. According to the embodiment, the depth of the groove 5 is 10 μm. More generally, a laser can therefore optionally be used to perform deep engraving on the surface treated by the double surface texturing or on the surface of the dial of which part is treated by the double surface texturing, to a depth greater than or equal to 5 μm, or even greater than or equal to 10 μm, and/or less than or equal to 15 μm. Naturally, this deep engraving is not a surface texturing. Thus, advantageously, the deep-engraving step is applied at least in part to the outline of that zone of said surface that is to be treated that has undergone the second surface structuring or that is at least in part superposed on the first surface structuring and/or the second surface structuring.

In a second embodiment variant, illustrated in FIG. 4, the second surface structuring is deeper than that illustrated by the embodiment corresponding to FIG. 3, allowing almost total or total clipping of the peaks of part of the surface treated by the first structuring. Thus, as depicted, the second structuring is able to completely eliminate some of the ribs 12 formed by the first structuring, thus hollowing out to the plane $P_1$. In this embodiment, the second structuring may form second striations 20 the bottoms 21 of which are in the plane $P_1$, to a depth identical to that of the first surface structuring.

The method then implements an optional step E30 of coloring the upper surface of the dial by depositing a coating 30. As a preference, this step is applied uniformly to the entire surface that is to be treated and even to the entire surface of the horology component, which is to say of the dial in this embodiment. To do that, the embodiment deposits a very fine coating, just a few nanometers thick, using the ALD technique. The material deposited may be any, for example chosen to bring about a particular coloration. It may be a noble metal; as an alternative, it may be a metal oxide. As an alternative, it is possible to deposit a coating uniformly, using electroplating, physical vapor deposition (PVD), PLD (pulsed laser deposition) or chemical vapor deposition (CVD). The coating is chosen (deposition technique, thickness, material, etc.) so that the topography formed by the double surface structuring is not lost.

As depicted in FIGS. 6 and 7, which correspond respectively to the embodiments of FIGS. 3 and 4, a coating 30 perfectly conforms to the topography of the upper surface of the dial and notably does not modify, or modifies to a negligible extent, the roughness and/or the reliefs formed by the two structuring steps E10, E20.

FIG. 8 illustrates another embodiment in which deep engraving is performed in addition to the two surface structurings. In this embodiment, zones 6 are produced using a laser, notably a nanosecond laser, on a dial that has had a second surface structuring preparation according to the embodiment illustrated in FIG. 3. In this example, in order to form an effect of depth, the zones 6 are deep enough to pass right through the malleable layer 2 and reach the brass of the lower part 1 of the dial plate. According to this embodiment, the depth of the zones 6 is 10 μm. More generally, a laser may therefore optionally be used to perform deep engraving on the surface treated by the first and/or double surface structuring, to a depth greater than or equal to 5 μm, or even greater than or equal to 10 μm. Naturally, this deep engraving is not a surface structuring. A coating 30 then perfectly conforms to the topography of the upper surface of the dial, and notably does not modify, or modifies only to a negligible extent, the roughness and/or the reliefs formed by the two structuring steps E10, E20 and the deep engraving step. This deep engraving may comprise striations and/or may form any pattern.

It is advantageous to note that, with a single coloration step, a number of different aspects are obtained thanks to the double surface structuring. Indeed it is possible to apply slight variations to this double surface structuring in different zones of the surface of a horology component in order to achieve appearances which differ to the naked eye. Thus, this double surface structuring, which forms a single surface texturing, and therefore extends to a very shallow depth, is able to produce particularly advantageous optical effects. In particular, the lightness L* of the differently treated zones varies slightly. Colorimetry measurements taken in different zones of a dial display a difference in lightness that is due to the difference in roughness or more generally in surface finish, which may fluctuate between 2 and 5. The lightness L* is evaluated in the space defined by the International Commission on Illumination, CIE, L*a*b*, as indicated in the "Technical Report of Colorimetry" CIE 15: 2004. The measurements are performed in SCI (specular component included) mode. The difference in lightness is $\Delta L^*=L_1^*-L_0^*$ where the suffixes "1" and "0" designate two elements of the dial that are to be compared.

One advantage of the invention is therefore that just one single coloration step induces different colored effects and/or different lightnesses and/or different optical effects on at least two respective different zones of said surface that is to be treated, thereby simplifying manufacture overall. Note that such an optical differentiation effect is also obtained without any coloration step.

Finally, optionally, the method then deposits a protective polymer layer, for example a 6 μm coat of zapon. In addition to this, optionally, the dial may undergo any other finishing step, such as tampography, for example to highlight various zones that have undergone the double surface structuring of the invention, and/or the printing of marks.

In an embodiment variant, the method may perform at least an additional third surface structuring step, after the two surface structurings E10, E20.

Advantageously, this third surface structuring will clip the peaks off all or part of the second surface structuring without impacting the first surface structuring. Alternatively, it may reach the first surface structuring in zones in which the second surface structuring has not been applied. This third step may be repeated as required, to form a multitude of differently treated zones.

Naturally, the invention does not relate to the design achieved by the surface structuring steps which are able to form any pattern, particularly lines, or even curves, which are for example parallel or substantially parallel. By way of example, the surface that is to be decorated may be split into different zones, each zone having a different second surface structuring, for example comprising striations with different orientations, which may for example be mutually perpendicular, or having a different roughness and/or orientation.

Advantageously, a first surface structuring comprises striations, which may or may not be parallel, and a second surface structuring, superposed with the first, forms a particular pattern, such as the design of a plant or of an animal, or writing, a mark for example, whose grooves forming the particular pattern cross one or several striations of the first surface structuring.

In addition, the invention is not limited to the example illustrated. In particular, the surface structuring steps may be performed using a multitude of solutions, preferably remaining within the malleable layer (without the addition of material, for example using a technique of the PVD, CVD, etc. type). In order to do that, the following solutions may be used:

- the techniques aimed at lowering the roughness of the surface to which they are applied, such as polishing, or such as, under certain conditions, sand blasting, shot peening, microbead blasting, or such as, under certain conditions, the use of a laser, including femtosecond or nanosecond lasers;
- techniques aimed at increasing the roughness of the surface to which they are applied, such as, under certain conditions, sand blasting, shot peening, microbead blasting, or such as, under certain conditions, the use of a laser, including femtosecond or nanosecond lasers;
- techniques known as fine lines techniques, such as satin finishing, brushing, snailing, sunray brushing, Côtes de Genéve striped waves, which aim to create striations (which may be obtained in the traditional way or using a laser), these notably including:
  - snailing, which is a decoration in the form of a spiral, generally performed on the barrel ratchet wheels, the oscillating weights, the barrels or else the barrel covers, but which can be envisioned on a dial. This decoration is obtained by means of a grinding wheel which is made to spin on the surface of the component, orienting it in such a way as to obtain spiral-shaped lines;
  - sunray brushing, which is a decoration formed of lines having the one same point of intersection, giving the component the appearance of a sun, as mentioned in the embodiment described;
  - Côtes de Genéve wavelike stripes, which form a striped pattern of brushed zones. It is possible to vary the width, the fineness, the angle and the separation, greater or smaller, between the stripes of waves. Using a back and forth movement, the abrasive or the brush marks the surface with straight or circular parallel striations which form the waves;
- stippling or circular graining techniques. The circular graining is a decoration formed of circles with concentric lines that are very closely spaced or even encroach on one another. It is commonly used to decorate the bridges, the mainplates, the bottoms of recesses and the dials. These may be obtained in the traditional way or using a laser.

It is of course conceivable to use a technique other than those mentioned hereinabove, in this surface structuring step, depending on the final appearance that is to be imparted to the dial. By way of example, here are some other possible techniques that can be employed in this surface treatment:

- satin finishing, brushing, wet sand blasting, which give a very fine and shallow texture;
- snailing, which consists in creating fine concentric circles which bring a surface to life;
- diamond polishing.

These surface structurings may therefore be performed using mechanical means (abrasive media, brushes, tools) or means of the laser type.

These surface structurings, notably the first surface structuring, may advantageously form a particular texturing which can be recognized by the formation of a particular pattern or profile. As an alternative, a surface structuring may form any particular roughness, not necessarily organized into a clearly identifiable profile.

As a preference, the second surface structuring forms a roughness less than or equal to the roughness of the first surface structuring and/or clips the peaks off all or part of the first surface structuring.

The second surface structuring step may create reliefs of a mean depth less than or equal to the mean depth of reliefs created by the first surface structuring.

More generally, the method performs a particular first surface structuring, and then a second surface structuring that modifies at least part of the first texturing formed by the first surface structuring. The invention applies to any superposition of two texturings having different roughnesses. It is not restricted to a roughness defining a particular decorative pattern, or collection of clearly delimited striations, but can be implemented with any roughness.

According to an advantageous embodiment, this double surface structuring is performed in the one same malleable layer.

According to another advantageous embodiment, a single coloration step applied to the double surface structuring is enough to obtain optical effects able to distinguish several different zones.

According to another advantageous embodiment, the second surface structuring is able to lower the mean level of the surface treated by the second structuring while maintaining the initial profile formed by the first surface structuring. This approach, which is performed by a laser, notably a femtosecond laser, thus offers the advantage of maintaining a profile of an initial roughness, which may for example be recognized by the naked eye, while at the same time modifying this by means of a second surface structuring so that it can be differentiated from its initial form.

The second surface structuring step may create a roughness of the surface that is to be treated that is less than or equal to the roughness created by the first surface structuring.

Note that, in all cases, the upper surface of the horology component is therefore at the surface of one or more superposed layers of materials that are different or not, rigid and/or malleable. The treatment performed by the two surface structurings is preferably performed entirely within one single upper layer, or else within several layers of different materials. However, in all cases, the double surface structuring is non-penetrating, which is to say does not extend all the way through the entire thickness of the horology component, and does not emerge through the lower surface of the horology component. The double surface structuring according to the invention is of very small thickness, as explained hereinabove, and advantageously affects only a small thickness relative to the total thickness of the horology component, for example extends over under 50%, or even under 30%, or even under 20%, or even under 10%, or even under 1%, of this total thickness. It has advantageously no effect on the opacity or transparency of said horology component. Thus, according to one advantageous embodiment, the double structuring according to the invention is performed on the upper surface of an opaque upper layer, which naturally remains opaque after the surface structurings have been performed, and more generally after any embodiment of the invention has been implemented. In other words, the surface structurings have a negligible impact on the opacity of one or several layers of the horology component. This opacity thus remains substantially equal at the level of the entire upper surface.

The invention also relates to a horology component obtained by the method of manufacture according to the invention.

Such a horology component may be a dial comprising at least two different zones, these at least two zones being treated by a different second surface structuring step to form different appearances so that said at least two zones can be visually distinguished from each other. By way of example, the different zones may correspond to hour indexes. As an alternative, such a dial may comprise at least one zone treated by at least a second surface structuring step to form a different coloration and/or a different lightness and/or a different optical effect allowing the zone treated by a second surface structuring step to be visually distinguished from the zone treated by a first surface structuring step.

The invention also relates to a timepiece, such as a watch, notably a wristwatch, comprising such a horology component.

The invention claimed is:

1. A method for manufacturing a horology component comprising a surface that is to be treated, the surface being optionally prepared beforehand through polishing and/or adding an upper layer of malleable material, wherein the method comprises:

a first surface structuring of the surface that is to be treated of the horology component, followed by a second surface structuring of the surface that is to be treated, structured by the previous first surface structuring, wherein the second surface structuring is at least partially superposed with the first surface structuring, wherein the surface that is to be treated belongs to an opaque upper surface layer of the horology component, the first surface structuring and second surface structuring having no impact or negligible impact on an opacity of the opaque upper surface layer, wherein the second surface structuring creates reliefs having a mean depth less than or equal to a mean depth of reliefs created by the first surface structuring, and/or the second surface structuring creates a surface roughness on the surface that is to be treated that is less than or equal to a surface roughness created by the first surface structuring.

2. The method for manufacturing a horology component as claimed in claim 1, wherein the first surface structuring and/or the second surface structuring creates reliefs having a mean depth less than or equal to 0.1 μm, and/or wherein the surface that is to be treated of the horology component was prepared beforehand through adding the upper layer of malleable material and the first surface structuring and/or the second surface structuring creates reliefs having a depth less than a thickness of the upper layer of malleable material in which the first and second surface structuring are created.

3. The method for manufacturing a horology component as claimed in claim 1, wherein the first surface structuring and/or second surface structuring creates reliefs having a mean depth greater than or equal to 0.05 μm.

4. The method for manufacturing a horology component as claimed in claim 1, wherein the second surface structuring is applied to only part of the surface treated by the first surface structuring.

5. The method for manufacturing a horology component as claimed in claim 1, wherein the method comprises at least an additional third surface structuring, applied to part of the surface that is to be treated after the surface that is to be treated has undergone the first surface structuring but not the second surface structuring and/or to part of the surface that is to be treated after the surface that is to be treated has undergone the first and second surface structuring.

6. The method for manufacturing a horology component as claimed in claim 1, wherein the first surface structuring consists in a satin finishing, a brushing, a snailing, a sunray brushing, creation of Côtes de Genève stripes of waves, a stippling, a circular graining, a wet sand blasting, a sand blasting, or a laser structuring, and/or wherein the second surface structuring consists in a wet sand blasting, a sand blasting, or a laser structuring.

7. The method for manufacturing a horology component as claimed in claim 1, wherein the surface that is to be treated of the horology component was prepared beforehand through adding the upper layer of malleable material, wherein the method comprises, before the first and second structuring, procuring a substrate and then adding the upper layer of malleable material to the surface that is to be treated to encourage the first and second surface structuring, a thickness of the upper layer of malleable material being less than or equal to 10 μm.

8. The method for manufacturing a horology component as claimed in claim 1, wherein the surface that is to be treated of the horology component was prepared beforehand through adding the upper layer of malleable material, and the first surface structuring is wholly performed in a thickness of the upper layer of malleable material comprising the surface that is to be treated.

9. The method for manufacturing a horology component as claimed in claim 1, wherein the method comprises at least two distinct zones of the surface that is to be treated in which the second surface structuring is different.

10. The method for manufacturing a horology component as claimed in claim 1, wherein the method comprises an additional depositing a protective polymer layer to the surface that is to be treated.

11. The method for manufacturing a horology component as claimed in claim 1, wherein the horology component comprises a layer of rigid material, and the surface that is to be treated of the horology component was prepared beforehand through adding the upper layer of malleable material on the layer of rigid material.

12. The method for manufacturing a horology component as claimed in claim 1, wherein the opaque upper surface layer is a surface layer of a monobloc made as a single layer of malleable material.

13. The method for manufacturing a horology component as claimed in claim 1, wherein the opaque upper surface layer is a surface layer of a bloc made of several superposed layers of malleable material.

14. The method for manufacturing a horology component as claimed in claim 1, wherein the second surface structuring creates reliefs having a mean depth less than a mean depth of reliefs created by the first surface structuring, and/or wherein the second surface structuring creates a surface roughness on the surface that is to be treated that is less than a surface roughness created by the first surface structuring.

15. The method for manufacturing a horology component as claimed in claim 1, wherein a zone treated by the second structuring is visually distinguished from a different zone treated by the first structuring.

16. The method as claimed in claim 1, wherein striations of the first structuring intersect striations of the second surface structuring.

17. The method for manufacturing a horology component as claimed in claim 1, wherein the surface that is to be treated belongs to the upper layer of malleable material, the first surface structuring and second surface structuring being performed in full or in part in the malleable material of the upper layer.

18. The method for manufacturing a horology component as claimed in claim 2, wherein the surface that is to be treated of the horology component was prepared beforehand through adding the upper layer of malleable material, wherein the upper layer of malleable material comprises silver, an alloy containing by weight at least 50% silver, gold, or an alloy containing by weight at least 50% gold.

19. The method for manufacturing a horology component as claimed in claim 1, wherein the method comprises, after the first and second surface structuring, coloring an entirety of the surface that is to be treated by depositing a layer of material.

20. The method for manufacturing a horology component as claimed in claim 19, wherein the coloring combined with the at least first and second surface structuring leads to a different coloration and/or a different lightness and/or a different optical effect on at least two respective different zones of the surface that is to be treated.

21. The method for manufacturing a horology component as claimed in claim 1, wherein the method comprises an additional deep engraving of the surface that is to be treated, to a depth greater than or equal to 5 μm, and/or the surface that is to be treated of the horology component was prepared beforehand through adding the upper layer of malleable material, and the method comprises an additional deep engraving of the surface that is to be treated, to a depth greater than or equal to a thickness of the upper layer of malleable material.

22. The method for manufacturing a horology component as claimed in claim 21, wherein the deep engraving is applied at least in part to an outline of a zone of the surface that is to be treated that has undergone the second surface structuring, or that is at least in part superposed on the first surface structuring and/or the second surface structuring.

23. A method for manufacturing a horology component comprising a surface that is to be treated, the surface being optionally prepared beforehand through polishing and/or adding an upper layer of malleable material, wherein the method comprises:

a first surface structuring of the surface that is to be treated of the horology component, followed by a second surface structuring of the surface that is to be treated, structured by the previous first surface structuring, wherein the second surface structuring is at least partially superposed with the first surface structuring, wherein the surface that is to be treated belongs to an opaque upper surface layer of the horology component, the first surface structuring and second surface structuring having no impact or negligible impact on an opacity of the opaque upper surface layer, wherein the first surface structuring and the second surface structuring respectively create striations, wherein striations of the second surface structuring are not parallel to striations of the first surface structuring.

24. The method as claimed in claim 23, wherein the striations of the first structuring intersect the striations of the second surface structuring.

25. A method for manufacturing a horology component comprising a surface that is to be treated, the surface being optionally prepared beforehand through polishing and/or adding an upper layer of malleable material, wherein the method comprises:

a first surface structuring of the surface that is to be treated of the horology component, followed by a second surface structuring of the surface that is to be treated, structured by the previous first surface structuring, wherein the surface that is to be treated belongs to an opaque upper surface layer of the horology component, the first surface structuring and second surface structuring having no impact or negligible impact on an opacity of the opaque upper surface layer, wherein the second surface structuring fully or partially takes tops off a texturing formed by the first surface structuring without modifying bottoms of the texturing formed by the first surface structuring, or the second surface structuring lowers a texturing formed by the first surface structuring without modifying a profile thereof.

26. A method for manufacturing a horology component comprising a surface that is to be treated, the surface being optionally prepared beforehand through polishing and/or adding an upper layer of malleable material, wherein the method comprises:

a first surface structuring of the surface that is to be treated of the horology component, followed by a second surface structuring of the surface that is to be treated, structured by the previous first surface structuring, wherein the surface that is to be treated belongs to an opaque upper surface layer of the horology component, the first surface structuring and second surface structuring having no impact or negligible impact on an opacity of the opaque upper surface layer, wherein the second surface structuring creates reliefs having a mean depth less than or equal to a mean depth of reliefs created by the first surface structuring, and/or the second surface structuring creates a surface roughness on the surface that is to be treated that is less than or equal to a surface roughness created by the first surface structuring.

27. A method for manufacturing a horology component comprising a surface that is to be treated, the surface being optionally prepared beforehand through polishing and/or adding an upper layer of malleable material, wherein the method comprises:

a first surface structuring of the surface that is to be treated of the horology component, followed by a second surface structuring of the surface that is to be treated, structured by the previous first surface structuring, wherein the surface that is to be treated belongs to an opaque upper surface layer of the horology component, the first surface structuring and second surface structuring having no impact or negligible impact on an opacity of the opaque upper surface layer, wherein the first surface structuring and the second surface structuring respectively create striations, wherein striations of the second surface structuring are not parallel to striations of the first surface structuring, wherein the second surface structuring creates reliefs having a mean depth less than a mean depth of reliefs created by the first surface structuring, and/or wherein the second surface structuring creates a surface roughness on the surface that is to be treated that is less than a surface roughness created by the first surface structuring.

* * * * *